Jan. 30, 1973

J. BJORKSTEN  3,713,945

METHOD FOR MAKING FIBER REINFORCED PLASTIC

Original Filed Jan. 17, 1968  3 Sheets-Sheet 3

United States Patent Office 3,713,945
Patented Jan. 30, 1973

3,713,945
METHOD FOR MAKING FIBER REINFORCED PLASTIC
Johan Bjorksten, P.O. Box 265, Madison, Wis. 53701
Continuation of abandoned application Ser. No. 698,544, Jan. 17, 1968. This application Aug. 17, 1970, Ser. No. 64,606
Int. Cl. B32b 31/06, 31/12
U.S. Cl. 156—278
14 Claims

ABSTRACT OF THE DISCLOSURE

A reinforced plastic film is made by binding fibers to at least one base film by means of a nascent adhesive formed from two or more components immediately before application to the film and (a) reacted almost completely within the seconds required for it to pass from adhesive applicator to laminator, or (b) brought within that time to a heavy enough consistency for holding the components together and then completing cure in storage. An adhesive applicator capable of operating with a rotogravure roller with a compound which may dry in seconds after preparation is accomplished by dispensing with the conventional adhesive pan and supplying the nascent adhesive directly to a doctor blade resting on an intagliated roller and equipped with an averaging electronic level control.

---

Figure 1:
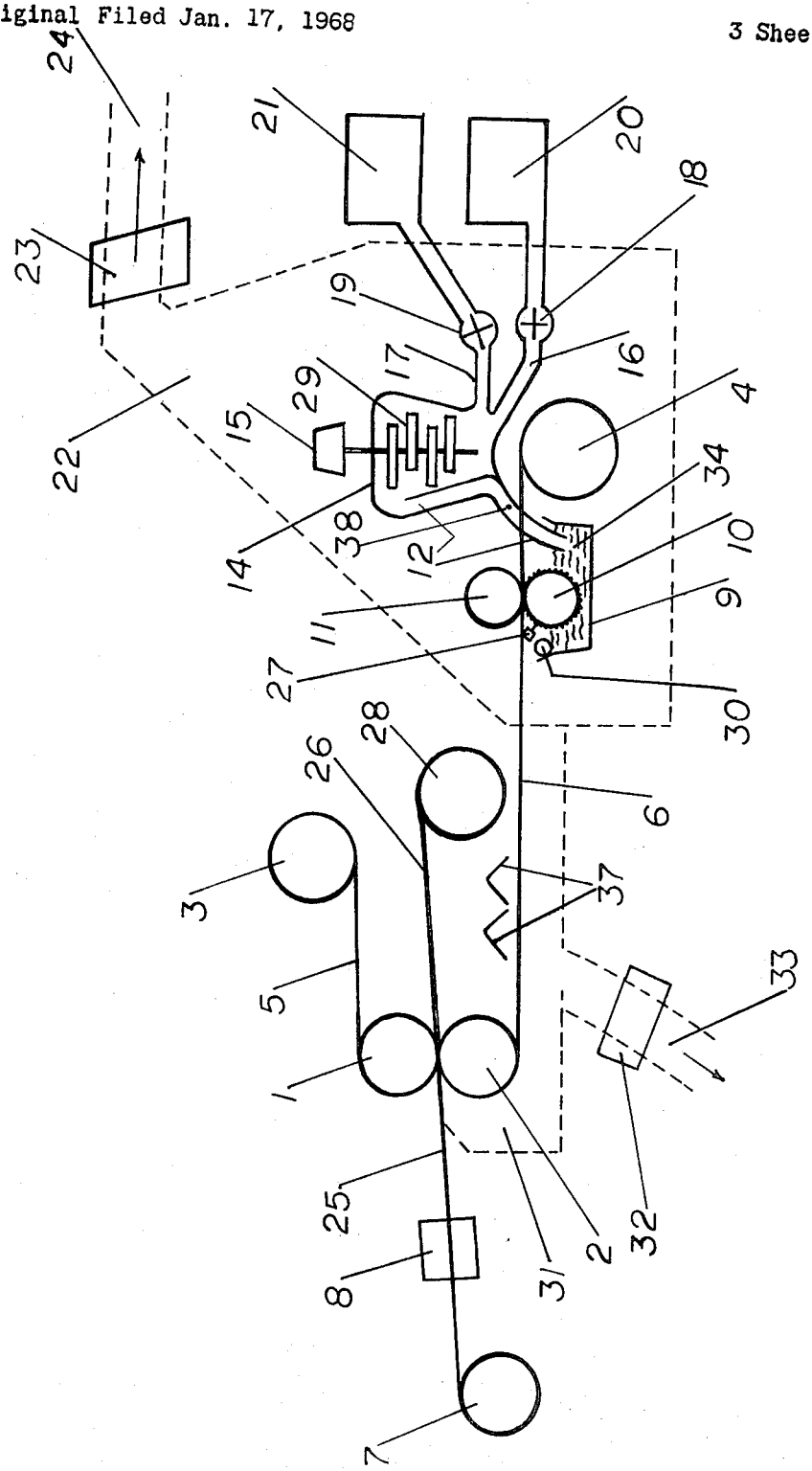

This application is a continuation of application Ser. No. 698,544 filed, Jan. 17, 1968, now abandoned.

This invention relates to reinforced plastic films, and particularly to films with slidably attached fibers; and further to methods and systems for producing reinforced plastic films of superior properties.

Heretofore such films have been made (1) by dispersing reinforcement fibers in a plastic mass—but such reinforcements are random and do not even approach the strength of oriented parallel or otherwise geometrically designed reinforcements, (2) by fusing fibers, weaves or scrims between two thermoplastic films; but such reinforcements will be sealed in so firmly that the fibers cannot slide together and co-act when under pressure and therefore are limited by the tensile strength of the individual fibers, (3) by embedding the fibers in a yielding layer bonded to at least one, usually two base films, such as a film of an adhesive, or a low molecular polymer which is yielding under such pressure as the fibers may exert in practice, yet hard to the touch. This last type of products of prior art may have good properties, but the products are all difficult to make.

If the adhesive is applied as a melt, it will not adhere sufficiently firmly to the base film or films unless it is applied at a temperature sufficient to mobilize the molecules in the boundary layers of the films. This is very difficult, if not impossible, to achieve in production because the temperature necessary to effect adhesion comes very close to, and may even exceed, the temperature at which the base film looses almost all strength and becomes impossible to handle in high speed production. If the melting point of the hot melt is reduced to make possible liquid application without excessively softening the base film, the resultant product will be sensitive to delamination under stress at summer temperature.

It has been attempted to make hot melts which become crosslinked subsequent to application, but the conditions to which they will be exposed while this post-application hardening or cure occurs are beyond control. This approach therefore will not yield products of the necessary uniformity and dependability.

Generating heat in the interphase between the films by supersonic, electrical induction or radiofrequency energies is too slow and far too expensive for mass production.

Heating with an airblast directed into the bite where the fibers are introduced and laminated also requires a very difficult split second control, because the films and fibers as under closely controlled tension, easily upset by the slightest difference in temperature or gas pressure, and the combination of both introduces excessive control problems.

The most commonly used method at the present time is to apply the adhesive in a solvent, and drying it on each of the two films to be laminated, then feeding the fibers together with the films into the bite between two pressure rollers, with the adhesive covered sides meeting. This procedure ensures excellent wetting of the film by the adhesive. Good adherence to both sides and to the fibers can be accomplished, but the manufacturing process leaves much to be desired:

The solvent is lost, or recovered at appreciable expense; its use involves fire hazards; both films have to be coated which means doubling the adhesive application and drying equipment, the necessity for drying the adhesive limits the speed of manufacture. The entire system is mechanically touchy and from the standpoint of chemical engineering undesirable in that it requires the cycling of large quantities of solvent spread out evenly over rapidly moving plastic films under close tension control.

An object of the present invention is a system for producing reinforced plastic film at increased speed and reduced expense.

Another object is a process for producing reinforced plastic film in which fibers are adhesively bound in orderly arrangement, in which the requisite properties are attained by application of adhesive to one side only, at which no heat, no solvent and no drying are required and which is compatible with production speeds in excess of 400 ft./min.

Another object is a reinforced plastic film of superior properties.

Another object is a machine for producing reinforced plastic film.

Further objects will become apparent as the following detailed description proceeds.

In accordance with my invention, I intermix in continuous, mechanically controlled manner three components, two of which combine to form a urethane, and the third, optional, present in a minor proportion, will modify the viscosity within the minutes following combination, so that the composite mixture of the ingredients can be applied onto the film rapidly and uniformly by an intaglio printing process or means producing the equivalent results. This third ingredient is compatible with the function of the system, and remains in the final product. Preferably it is a polymer, soluble in either or both of the other ingredients at ordinary or mildly elevated temperatures. By "mildly elevated" I mean a temperature at which the tension relationships of the elements comprising the final product are not objectionably disturbed.

Figure 2:
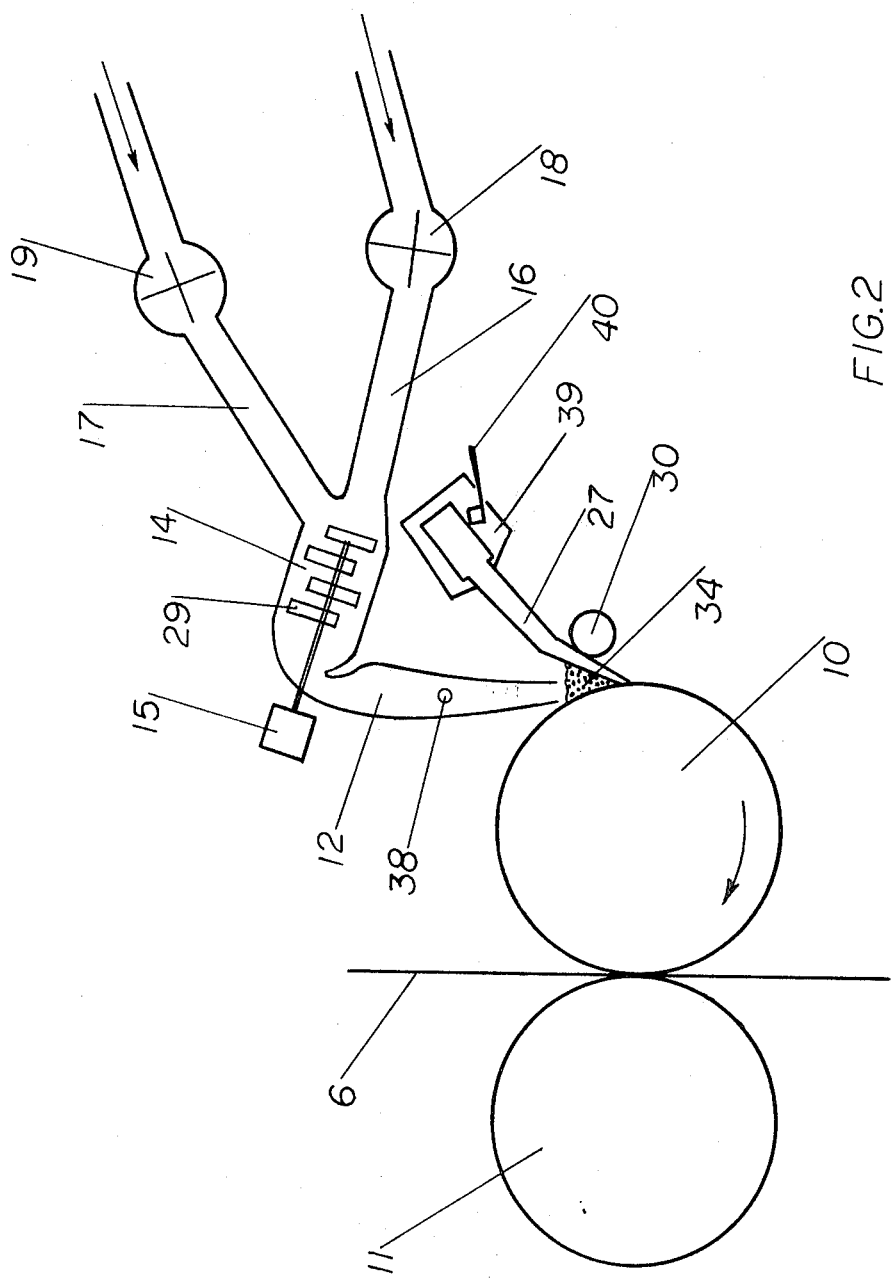
Figure 3:
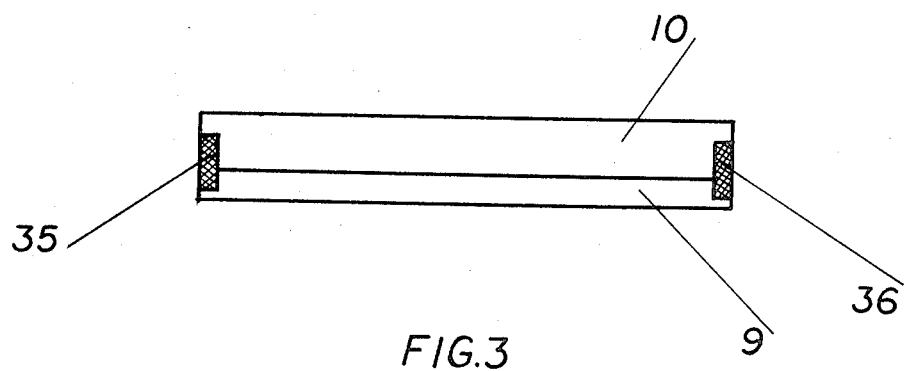
Figure 4:
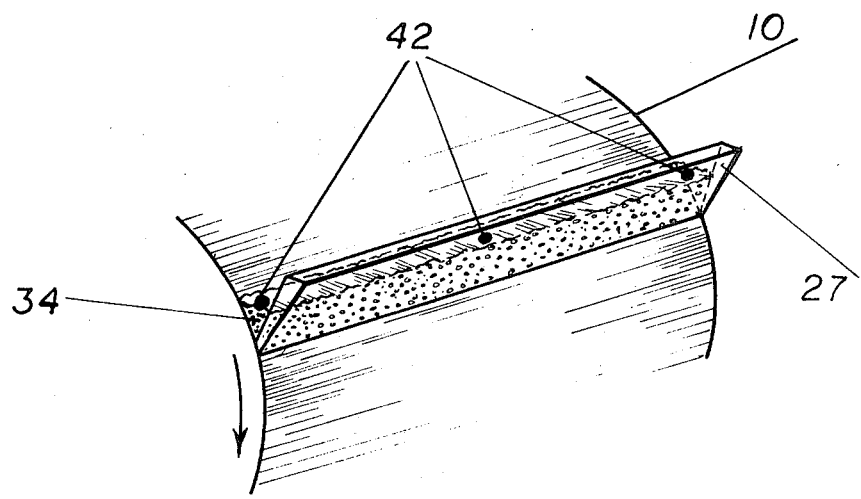

The invention is explained in detail in conjunction with the drawings, of which FIG. 1 is a diagrammatic side view, FIG. 2 is a sectional side view, FIG. 3 a top view and FIG. 4 a perspective view.

Referring now to FIG. 1: 1 and 2 are the pressure rollers which effect the lamination. These are preferably rollers of about 10″ diameter, elastomer coated, hardness about 60 to 80 Shore. 3 and 4 are supply rolls of raw materials film, 5 and 6, which move into the bite between lamination rollers 1 and 2 so as to close over the fibers 25, either woven or nonwoven (preferably the latter), which are fed in from a fiber supply 7 and usually through a fiber arranging or coordinating means 8. In order to make the laminate, it is further necessary to supply means for adhering these components together and these means must be present at the point the films and the fibers are carried into the bite between rollers 1 and 2. For this purpose I employ a short pot life polyurethane adhesive, which is synthesized just prior to application and applied to the film by suitable metering means, preferably in the nascent state. The adhesive means so obtained are highly efficient also in securing the bond of the fiber, and therefore it may not be necessary to apply them to more than one of the components moving into the bite between rollers 1 and 2. They can be applied to the fibers, they can be applied to film 5 or film 6 as is shown in FIG. 1. Here film 6 coming from roll 4 is passed over a metering roller 10, which is either knurled or etched, and is the kind of roller used in rotogravure printing. 11 is an elastomer coated roller which secures the requisite pressures between the printing roller 10 and the film. 27 is a doctor blade which scrapes off any excess adhesive from roller 10.

The adhesive itself is formed in the mixing means 14, here shown as a conical container provided with a mixing agitator 29 driven by a motor 15. Inasmuch as the basic principle here employed requires that the adhesive have a very short pot life, it should preferably be formed within minutes of the time of application. To this end, the two principal components of the adhesive, an isocyanate and an isocyanate reactive monomer when a polyurethane type adhesive is used is here preferred, or an epoxy compound and a polyamid resin, respectively, are supplied from containers or reactors 20 and 21 to mutually geared or coupled metering means 18 and 19 so that they are always fed in the proper proportions to a mixing means 14 where they become thoroughly intermingled with great rapidity and from which the nascent adhesive emerges and moves through the short tube 12 by pump, or by gravity pressure to the adhesive supply container 9 of the printing roller. The level in this supply 9 is controlled by means of the level control 30 preferably operating on capacitor or other electronic sensing principle which governs the rate of operation of the metering means 18 and 19 and thereby the rate of operation and supply of the adhesive. The adhesive container 9 has been shown in this diagram disproportionately large in order to make it possible to show the various parts with clarity. Actually I prefer to have it fit roller 10 as snugly as is compatible with its function and to have the smallest volume possible so as to avoid any excess of adhesive on the roller at any time and to minimize the time required for any adhesive molecule to reach the laminating rollers.

With adequately sensitive level control means, I may even dispense with the reservoir 9 altogether and feed the reactive material directly onto the doctor blade and have the level control determine the size of the revolving pool ahead of the doctor blade, as detailed in FIG. 2.

The adhesive thus applied is sufficiently tacky as prepared to keep together the components of the laminate at the point of lamination between rollers 1 and 2, and thereafter as they together move as a finished laminate 26 to the take-off roller for final product 28, from which it can be slit off and removed from wind-up mechanisms not shown here because any conventional wind-up mechanism may be used. The adhesive firms to the desired consistency before the product is shipped.

Inasmuch as the isocyanate component is quite toxic until reacted, when it becomes entirely innocuous, the ventilating system 22 is provided which encloses those parts of the device where free isocyanate may be present. This comprises an enclosure 22, an exhaust blower 23, and an exhaust duct 24. In addition, tubes and ventilators 31 may extend to the bite covering the entire path of film 6 prior to lamination. This may not be necessary in some cases, but if the tests show the presence of any isocyanate in the ambient air such ventilating means should be employed. 32 is the blower for the second ventilating means and 33 its exhaust duct.

In the system shown above, when the polyurethane adhesive is formed as applied, the viscosity of this system may be too high for an application with a rotogravure type metering roller. This problem can be solved in two ways, namely (1) by minimizing the time of application from mixer to metering roller, so as to bring the adhesive to this roller before its viscosity exceeds say 1000 cps., or say within the range of about 5–50,000 cps., or (2) by adding a moderating constituent to somewhat delay the setting time in order to apply the composition at still sufficiently low viscosity for metering by the metering roll. In the machine shown in FIG. 1, the latter of these alternatives has been employed; the former is shown in detail in FIG. 2. When a setting time moderator is used, I prefer one which in itself has appreciable film strength. Any diluent at all will prolong the setting, and I may use a small quantity, less than 50% and preferably less than 20%, of any solvent compatible with the composition which can be driven off or evaporated. However this would, at least in part, defeat one of the principal advantages of the device, namely that of complete freedom of solvent and elimnation of the necessity to apply heat. Therefore I prefer to use less than 50% and preferably less than 20% of a polymeric extender which is soluble in either one or preferably both of the components of the isocyanate and which does not require removal. Such suitable materials are, for example, alkyd resins, with or without catalysts, soluble cellulose esters or ethers, acrylate resins, and any other solid diluents compatible with the urethane resins and which do not objectionably reduce its mechanical properties. It is preferred that the adhesive have a viscosity in excess of 50,000 cps. within 2 days after its application to the film and above 250 cps. at the point of lamination, and that the time of passage from adhesive application to lamination be less than 10 minutes.

The turnover rate of the adhesive in the wedge between doctor blade and roller should preferably be greater than once a minute.

The other alternative, that of the minimum time device, is shown in FIG. 2. Here again the two component ingredients of the adhesives are metered by the metering devices 18 and 19 which are geared together so that regardless of the speed of supply, the preset proportion between these ingredients will always be maintained. Through the pipes 16 and 17, they are supplied to the mixing device 14 which in this case has been reduced to the minimum volume compatible with doing a rapid and complete mixing job. The nascent adhesive emerges through the exit tube 12 from the mixer into the pool formed between the doctor blade 27 and the roller 10 on the long side and by stops 35 and 36, FIG. 3, which are made to conform with the geometry of the contact area between the doctor blade and the cylinder so as to prevent or greatly retard the influx or leakage on the side of the adhesive in the pool 34. The doctor blade 27 in this case may be made of a resilient plastic such as an acetal plastic such as the one sold by the du Pont Co. under the trade name of "Delrin" or by the Celanese Co. under the name of "Celcon," or it may be made of a glass fiber reinforced Teflon (polytetrafluoroethylene) in order to facilitate cleaning. In this case, the electronic sensing and controlling device 30 is placed on the distal side of the doctor blade so as to sense through the doctor blade the average level of the pool 34. This sensor 30 controls the operation of the metering means 18 and 19 which in turn control the influx of the ingredients for the adhesive. The adhesive supply is thereby regulated in such a fashion that the pool 34 is kept at a constant level, and so that no portion of the material or the adhesive requires a pot life more than a few seconds, between the time of mixing and the time when it is taken up by the metering roller 10 and applied by it to the film 6 on which it then within the next few seconds hardens to a higher viscous consistency. The sensing means shown have the advantage of averaging the level of the pool; however in those cases where it is preferred to employ a doctor blade of steel, one or more miniature level controllers 42 will be inserted into the bite in the desired position, preferably one such unit at each end of the doctor blade and one in the middle, as shown in FIG. 4. In FIGS. 2 and 4, 39 means for holding the doctor blade in the desired position and 40 means for releasing the doctor blades for rapid exchange when it shows signs of wearing too thin. 42 are the level microsensors. These can, for example, be microswitches which are tilted when the level exceeds a certain point. In order to minimize the wear of a doctor blade made of non-conductive materials, I may provide it with an edge of a very abrasion resistant material, such as spring steel. If I use a doctor blade made entirely of metal, I use sensors 42 placed in the pool of adhesive or at its surface at a desired level of adhesive, to control this.

In this description, I am using the term "adhesive" to denote any composition which envelops, hold or attaches the fibers to the base film, adhering to the components it contacts. My preference is for adhesives having a cohesive strength lower than that of the base film, so that on application of stress the fibers can slide and/or bunch together and/or otherwise co-act so the stress will be countered by a multiplicity of fibers at the same time.

This adhesive, in accordance with the invention, is preferably a polyurethane adhesive, made by intermingling a diisocyanate with a substance reactive with this to form a polymer, such as a polyol, a polyamino compound, a hydroxycarboxylic acid or a carboxylic acid ester or the like, and/or any other moiety containing polar groups strongly reactive with isocyanates. Other preferred compounds for this purpose are combinations of epoxy resins such as, for example, an epoxylated linseed oil or other epoxy fatty acids. The reaction products of peroxy acetic acid or analogues with unsaturated compounds and the like as one constituent and a liquid polyamid monomer as another constituent are suitable when the resultant product has the required adhesive properties. Still another adhesive is an acrylate composition, which can be activated or triggered by ionizing radiation such as, for example, from an electron beam, from a radioactive material, or the like.

When I refer to a multicomponent material, I mean a substance which is formed in the process by interaction of at least two components. Whether these be components such as those mentioned above or whether they also include either premixed with one of these ingredients or separately other auxiliary and useful constituents such as catalysts, accelerators, pigments, dye stuffs, foaming agents, gas cells, or metal particles for magnetic or electrical detection, is irrelevant.

When I refer to an intagliated roller, I mean a roller such as, for example, a printing roller which has on its surface a multiplicity of depressions or very small pits or grooves, adapted to receive liquid substances and upon contact pressure against plastic film, to deposit these in precisely metered quantities determined by the size of said pits and/or grooves onto the said film.

This metering procedure requires in the adhesive a viscosity sufficiently low to permit the intagliated pits to fill and to empty their contents on each revolution of the intagliated cylinder. For the purposes of this application, a knurled cylinder is usable as well as an intagliated cylinder. Suitable viscosity may be attained by delaying the application of the adhesive composition to the metering cylinder until the necessary bodying up to a god printing viscosity has taken place, and then to feed it to the cylinder and to print it out before the viscosity has increased beyond about the consistency of honey at room temperature.

If it is necessary to adjust the composition somewhat in order to attain this, I may add a bodying agent such as, for example, a micro crystalline cellulose or asbestos such as those made by the FMC Corporation, or the molecular silica gels such as the one known in the trade as "Santocel" and sold by the Monsanto Chemical Co., or a polyamine fatty acid soap, or if it is necessary to lower the viscosity, I may add any low molecular organic solvent such as a chlorinated solvent, aliphatic or aromatic solvents, ethylacetate, acetone, dimethylsulfoxide, and the like. These may be added either with one or both of the other main components, or they may be separately fed to the liquid supply.

Referring to FIG. 2, particularly to the arrangement of the pool of adhesive 34 over doctor blade 27, I may permit the adhesive to run over at the ends of said doctor blade, collect it there, and recirculate it to the main pool of adhesive, or I may use side stops to maintain a pool in a confined area. Such sidestops (35 and 36, FIG. 3) are suitably made of Teflon or Teflon coated material of any kind, of wood, or of a metal nonreactive with the adhesive components used. When I refer to a major ingredient or a minor ingredient, I understand that a major ingredient could be somewhat less than 50% but in that case it would still be one of the principal reactants without which the compound would not function properly, and which gives character to the compound used. With the minor ingredients, I mean the opposite of this and, in any event, something that is less than 50% of the composition.

While it is my preference to carry out the operation without the use of either heat or cooling, I also have a strong preference for evolving the principal amount of reaction heat before the coated film which carries adhesive reaches the bite between rollers 1 and 2 and becomes laminated in conjunction with the fiber 25, FIG. 1. Ordinarily I attempt to achieve this by governing the flow rate of the supply of the liquid by the viscosity as determined by the viscosity sensor 38 placed anywhere close to the exit of the adhesive mixing arrangement, so that the material when it reaches the intagliated roller will already be polymerized to such a degree that the remaining polymerization will take place between the adhesive application and the lamination. To accomplish this with reasonable completeness at high speed, it may be necessary to apply heat to the film, for example, from heating means 37, positioned between the adhesive applicator and the laminating rollers. This has not only the advantage of high speed production but also the advantage that the adhesive has reached approximately its ultimate rigidity by the time it arrives in the bite; further heat then will not develop in the roll, and no influence is exerted to distort the roll of finished laminate in storage, as easily happens if the adhesive continues to polymerize or to react after the lamination is completed.

I may however dispense with the very rapid hardening, and wind up the laminate on a roller before the adhesive is fully set, provided that (1) the adhesive is a relatively soft adhesive which when cured on a roll will still not have the force to cause curling up of the roll when laid flat or, (2) alternatively, I may print it in small dots, like a halftone rotogravure picture, so that the individual droplets or goblets of adhesive applied to the laminate will not be connected or smeared together but will be separate each in itself, and therefore will not have the continuity nor the leverage which is necessary to exert a curling influence when allowed to set on a curve.

The films used for the purpose of the invention are preferably either polyolefin films such as polypropylene, polyethylene, copolymers thereof, or polyvinyl halide films, either rigid, calendered, or plasticized, and with either liquid or polymeric plasticizers, or polyfluoro hydrocarbons, polystyrenes, polyvinylidene or polyvinyl halide films, such as "Saran," or "Tedlar" respectively, or polyester, polyacetal, and the like. Generally speaking, I may use films as well as fibers of any polymeric material which has physical properties similar to or better than those enumerated above, whether those are already known or some that may be developed in the course of future research.

The invention is further illustrated by the following examples:

Example 1.—Toluylene diisocyanate and ethylene glycol diresinoleate were mixed together in molecular proportions 1.1 to 1. 2% of dibutyl tin were added and the composition was agitated until the viscosity curve began to slope upward in a curve having a tangent diverging more than 45° from the horizontal plane. At this point, the material was applied between two sheets of polyethylene, electrostatically treated for adhesion to polar compounds, and passed into the bite between two rubber rollers of 65 shore hardness, together with a scrim of 300 denier nylon fibers intersecting at a 90° angle with each other and 45° angle against the bite of the rollers. The time between the application to the plastic and lamination in the bite of the rollers was 1 min. 30 seconds. Upon inspection, the resultant laminate proved to have a good strength together with flexibility. On cutting a hole in the center of a sheet of laminate and pulling outward from the edges of the cut, the fibers would aggregate and form a rope limiting the tear.

Example 2.—Hexamethylene 1,6 diisocyanate and hexenetriol 1,2,6 were intermixed in molecular proportion 1.05 to 1. The resultant mixture was fed onto an intagliated roller, which applied it to a 1.5 mil polyethylene film at a speed of 1 lb. per minute over a width of 55 inches. The application to the said roller was made when the viscosity of the composition had reached 300 centipoises. The film was then laminated with another film of polyethylene, both being of the low density type, and scrim of polyethylene glycol terephthalate fibers of 100 denier was fed into the bite, said fibers being in non-woven parallel layers, having a 60° angle with each other and one of the layers being parallel with the direction of the bite. The composition had not set at the point of lamination, and the rolls of the finished product were wound up. After 3 days in storage, the adhesive had set and the films were firmly connected with each other and with the fibers.

These examples are to be regarded as illustrative only, as variations in equipment or procedure have to be accompanied by variations in formulation of the adhesive. For example, if the machine is speeded, a tempering agent may be reduced in quantity, or omitted, catalyst may be added, and temperature increased. If on the other hand, a slow cure with long pot life and some final curing on standing in storage is desired, the catalyst may be omitted, temperature reduced, and a solvent diluent or other moderating agent added. An almost infinite number of variations may occur, but it is within the skill of those familiar with the art to make the necessary adaptations.

It is thus clear that the invention is capable of considerable variation. In a general way, it comprises the concept of producing film reinforced with fibers preferably prearranged in a definite pattern so that several fibers can co-act to meet a stress, such as parallel fibers in bundles or layers or otherwise, or in woven or nonwoven patterns of an orderly character, such as woven or nonwoven scrims, or the like, said fibers being fed into the bite of two rollers together with at least one base film, an adhesive to bind the fibers to said base film or films, which has been produced immediately before application. In particular, the invention contemplates such laminates based on the use of nascent adhesives, having pot lives less than a couple hours and preferably less than 20 minutes and even a couple minutes, the application of said adhesives being timed so that they are printable by intagliated roller at the time of application to the base film and have adequate firmness already at the point of lamination. The nascent polyurethane adhesives are preferred for this invention.

If desired, the adhesive can be caused to foam immediately after application, for example by supplying small amounts of water, or of an amino compound, to an isocyanate compound at the mixer immediately preceding the adhesive applicator. The timing and proportioning used should be such that viscosity on application remains such that the material is applicable with a knurled or intagliated metering roller or the equivalent.

Having thus disclosed my invention, I claim:

1. In a method of producing a fiber reinforced resinous layer, the combination of steps comprising:
continuously mixing together
two predominantly monomeric components
which react to form a polymer, and
which begin to so react to form said polymer upon contact with each other, and
continuously coating the resultant mixture on a film of synthetic resinous material,
carrying out said mixing and said coating conjointly so that said mixture is coated at the same rate that said components are mixed, and
at least partially polymerizing said mixture while said mixture is carried by said film, and
introducing fiber reinforcement into said mixture while said mixture is carried by said film.

2. The method of claim 1 characterized by carrying out said polymerization of said mixture without the introduction of further components and substantially without the introduction of energy.

3. The method of claim 1 wherein a modifier, which does not take part in said polymerization reaction, is included in as an additional component in said mixture.

4. The method of claim 3 wherein said modifier is a reaction tempering compound.

5. The method of claim 4 wherein said reaction tempering compound is pre-mixed with one of said polymer components.

6. The method of claim 1 wherein a solvent is included as an additional component in said mixture and is at least partially removed therefrom by drying after coating said mixture on said film and while carrying out at least some portion of said polymerization reaction.

7. The method of claim 1 wherein a catalyst is included in said mixture and said components begin to undergo said polymerization reaction upon contact at least in part by reason of the presence of said catalyst.

8. The method of claim 1 wherein said polymer is a polyurethane.

9. The method of claim 8 wherein said predominately monomeric components are a polyol and an isocyanate strongly reactive therewith.

10. The method of claim 8 wherein said polymer components are an isocyanate and a moiety containing polar groups strongly reactive therewith.

11. The method of claim 1 wherein said polymer is a polyanide.

12. The method of claim 1 wherein said polymer is an epoxy resin.

13. The method of claim 1 wherein said polymer is a polyacrylate.

14. The method of claim 1 wherein said polymerization reaction is continued after said coating and prior to said introducing of fiber reinforcement.

References Cited

UNITED STATES PATENTS 3,536,551   10/1970   Simon ............ 156—276 X

WILLIAM A. POWELL, Primary Examiner

U.S. Cl. X.R.

156—79, 276, 330, 331, 332; 161—59, 88, 89, 170, 184, 190